United States Patent [19]

Liu et al.

[11] Patent Number: 4,659,765
[45] Date of Patent: Apr. 21, 1987

[54] ELASTOMERIC COMPOSITIONS

[75] Inventors: Nan-I Liu; Russell J. McCready, both of Mt. Vernon, Ind.

[73] Assignee: General Electric Company, Pittsfield, Mass.

[21] Appl. No.: 702,546

[22] Filed: Feb. 19, 1985

[51] Int. Cl.$^4$ .................. C08L 67/02; C08L 79/08
[52] U.S. Cl. .................. 524/447; 524/445; 525/66; 525/89; 525/92; 525/167
[58] Field of Search ............ 525/66, 89, 92, 167; 524/445, 447

[56] References Cited

U.S. PATENT DOCUMENTS

| 3,274,159 | 9/1966 | Kluiber | 260/75 |
|---|---|---|---|
| 3,907,926 | 9/1975 | Brown | 525/444 |
| 4,200,567 | 4/1980 | Goldman | 525/183 |
| 4,212,791 | 7/1980 | Avery | 525/67 |
| 4,277,391 | 7/1981 | Charles | 525/64 |
| 4,371,692 | 2/1983 | Wolfe | 528/289 |
| 4,371,693 | 2/1983 | Wolfe | 528/292 |
| 4,556,705 | 12/1985 | McCready | 528/289 |

FOREIGN PATENT DOCUMENTS 1431916  4/1976  United Kingdom .

Primary Examiner—John C. Bleutge
Assistant Examiner—Patricia A. Short
Attorney, Agent, or Firm—Edward K. Welch, II; William F. Mufatti; Richard J. Traverso

[57] ABSTRACT

Novel thermoplastic molding compositions having excellent stress-strength characteristics, particularly low temperature impact strength, comprising an admixture of a thermoplastic elastomer, a thermoplastic polyester, a modifier resin and, optionally clay.

29 Claims, No Drawings

ELASTOMERIC COMPOSITIONS

The present invention relates to novel thermoplastic elastomeric molding compositions. Depending upon their compositional makeup, these compositions have a number of excellent and highly desirable physical properties including excellent tensile elongation and low temperature impact strength as well as other highly desirable stress-strength characteristics including the ability to absorb high energy and "spring back" with little or no permanent deformation upon impact. Specifically, the compositions of the instant invention comprise polyetherimide esters or polyetherester imides having admixed therewith a combination of:

(a) a high molecular weight polyester, and
(b) a homopolymer or copolymer modifier resin having as a major substituent units derived from one or more monomers selected from the group consisting of vinyl aromatic monomer, esters of acrylic and alkyl acrylic acids and conjugated dienes, and, optionally
(c) clay filler.

Polyether ester imides are well known having been described in numerous publications and patents including for example, Honore et al, "Synthesis and Study of Various Reactive Oligmers and of Poly(ester-imidee-ther)s," *European Polymer Journal* Vol. 16, pp. 909–916, Oct. 12, 1979; and in Kluiber et al, U.S. Pat. No. 3,274,159 and Wolfe Jr., U.S. Pat. Nos. 4,371,692 and 4,371,693, respectively. More recently, McCready in pending U.S. patent application Ser. No. 665,277 filed Oct. 26, 1984, now U.S. Pat. No. 4,556,705, disclosed a novel class of polyetherimide esters having superior elastomeric and other desired characteristics.

While the foregoing polymers having ether, imide and ester units have many desired properties including good flexibility, impact strength and moldability, these compositions are limited to certain applications where physical integrity or stiffness of the part is not desired or necessary due to their very low flexural modulus. Additionally, these compositions have very poor heat sag resistance. Thus, molded parts from these compositions severely sag upon exposure to high temperatures, e.g. greater than 250° F.

It is an object of the present invention to provide novel thermoplastic molding compositions having excellent elastomeric properties including the ability to absorb and withstand high energy impact and "spring back" to its previous state or shape upon removal of the impinging energy with little or no permanent deformation.

It is also an object of the present invention to provide novel thermoplastic molding compositions having excellent impact strength, particularly low temperature impact strength, while, where desired, retaining good flexibility.

Furthermore, it is an object of the present invention to provide novel thermoplastic molding compositions which have surprisingly high tensile elongation as well as excellent melt and crystallization temperatures and related characteristics.

It has now been discovered that novel thermoplastic molding compositions may be prepared which overcome the foregoing deficiencies and have good overall physical characteristics including high strength and stress-strain properties, good impact resistance and good moldability.

SUMMARY

In accordance with the present invention there are provided novel thermoplastic compositions having excellent impact strength, particularly low temperature impact strength, and excellent tensile elongation and/or Dynatup properties comprising an admixture of (A) one or more thermoplastic elastomeric polymers characterized as having ether, ester and imide linkages and wherein the ether linkages are present as high molecular weight, ie. number average MW of from about 400 to about 12000, polyoxyalkylene or copolyoxyalkylene units derived from long chain ether glycols and long chains ether diamines, (B) one or more high molecular weight thermoplastic polyesters, (C) one or more homopolymer or copolymer modifier resins having as a major constituent units derived from one or more monomers selected from the group consisting of vinyl aromatics, esters of acrylic and alkylacrylic acids and conjugated dienes, and, optionally, (D) clay filler.

Depending upon the desired physical properties of and the end use application for the resultant composition, these compositions are generically comprised of from about 90 to about 5 parts by weight A, from about 5 to about 90 parts by weight B, from about 5 to about 35 parts by weight C and from 0 to about 30 parts by weight D. Preferred compositions are those having good flexibility combined with impact strength, consequently these preferred compositions will comprise from about 90 to about 40 parts by weight A, from about 5 to about 50 parts by weight B, from about 50 to about 35 parts by weight C and from 0 to about 30 parts by weight D.

DETAILED DESCRIPTION OF THE INVENTION

Thermoplastic elastomeric polymers (A) suitable for use in the practice of the present invention are characterized as containing imide, ester and ether linkages wherein the ether linkages are present as high molecular weight, ie. from about 400 to about 12000 number average MW, preferably from about 900 to about 4000, polyoxyalkylene or copolyoxyalkylene units derived from long chain ether glycols and long chain ether diamines. Typically these thermoplastic elastomeric polymers are referred to as poly(etherester imide)s, poly(ester imide ethers) and poly(etherimide ester)s.

Suitable poly(etherester imide)s and poly(esterimide ether)s and their manufacture are described in, for example, Honore et al "Synthesis and Study of Various Reactive Oligomers and of Poly(esterimide ethers)", European Polymer Journal, Vol. 16 pp. 909–916, Oct. 12, 1979 and in Wolfe Jr., U.S. Pat. Nos. 4,371,692 and 4,371,693, herein incorporated by reference. These are characterized as comprising units of the formulas:

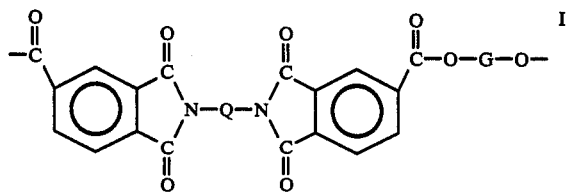

and

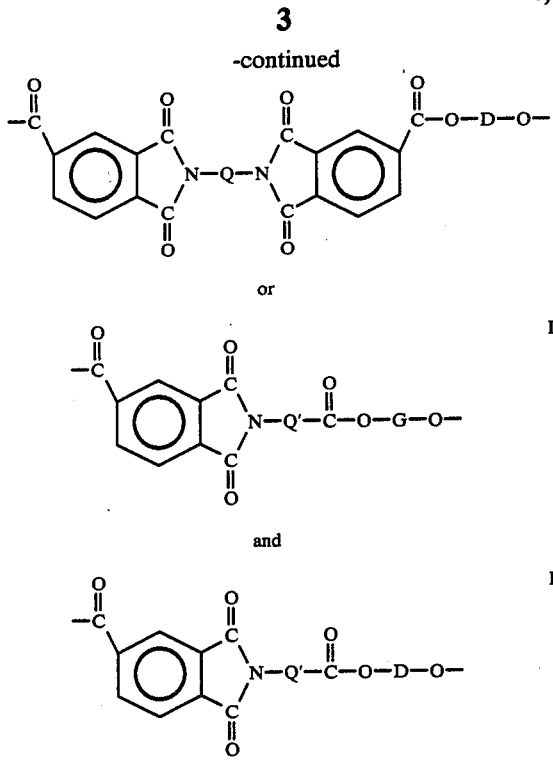

or mixtures thereof wherein G is a divalent radical remaining after the removal of terminal (or as nearly terminal as possible) hydroxyl groups from a long chain poly(oxyalkylene)glycol having a number average molecular weight of from about 400 to about 12000; D is a divalent radical remaining after the removal of hydroxyl groups from a diol having a molecular weight less than about 300; Q is a divalent radical remaining after removal of amino groups from an aliphatic primary diamine having a molecular weight of less than 350 and Q' is a divalent radical remaining after removal of an amino group and a carboxyl group from an aliphatic primary amino acid having a molecular weight of less than 250, with the proviso that from about 0.5 to about 10 D units are present for each G unit.

Each of the above esterimide units exemplified by formulas I and II and formulas III and IV contain a diimide-diacid radical or an imide-diacid radical, respectively. As described in Wolfe, these are preferably prepared by reacting the respective aliphatic diamine or amino acid with trimellitic anhydride either in a separate step prior to polymerization or during the polymerization itself.

Long chain ether glycols which can be used to provide the -G- radicals in the thermoplastic elastomers are preferably poly(oxyalkylene)glycols and copoly(oxyalkylene)glycols of number average molecular weight of from about 400 to 12000. Preferred poly(oxyalkylene) units are derived from long chain ether glycols of from about 900 to about 4000 number average molecular weight and having a carbon-to-oxygen ratio of from about 1.8 to about 4.3, exclusive of any side chains.

Representative of suitable poly(oxyalkylene)glycols there may be given poly(ethylene ether)glycol; poly(propylene ether)glycol; poly(tetramethylene ether)glycol; random or block copolymers of ethylene oxide and propylene oxide, including ethylene oxide capped poly(propylene ether)glycol and predominately poly(ethylene ether) backbone, copoly(propylene etherethylene ether)glycol and random or block copolymers of tetrahydrofuran with minor amounts of a second monomer such as ethylene oxide, propylene oxide, or methyltetrahydrofuran (used in proportions such that the carbon-to-oxygen ratio does not exceed about 4.3). Polyformal glycols prepared by reacting formaldehyde with diols such as 1,4-butanediol and 1,5-pentanediol are also useful. Especially preferred poly(oxyalkylene)glycols are poly(propylene ether)glycol, poly(tetramethylene ether)glycol and predominately poly(ethylene ether) backbone copoly(propylene etherethylene ether)glycol.

Low molecular weight diols which can be used to provide the -D- radicals are saturated and unsaturated aliphatic and cycloaliphatic dihydroxy compounds as well as aromatic dihydroxy compounds. These diols are preferably of a low molecular weight, ie. having a molecular weight of about 300 or less. When used herein, the term "diols" and "low molecular weight diols" should be construed to include equivalent ester forming derivatives thereof.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methyl propanediol; 2,2-dimethyl propanediol; hexanediol; decanediol; 2-octyl undecanediol; 1,2-, 1,3- and 1,4- dihydroxy cyclohexane; 1,2-, 1,3- and 1,4-cyclohexane dimethanol; butenediol; hexene diol, etc. Especially preferred are 1,4-butanediol and mixtures thereof with hexanediol or butenediol, most preferably 1,4-butanediol.

Aromatic diols suitable for use in the preparation of the thermoplastic elastomers are generally those having from 6 to about 19 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl) propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred thermoplastic elastomers are those in which 1,4- butanediol is present in a predominant amount, most preferably when 1,4-butanediol is the only diol.

Diamines which can be used to provide the -Q-radicals in the polymers of this invention are aliphatic (including cycloaliphatic) primary diamines having a molecular weight of less than about 350, preferably below about 250. Diamines containing aromatic rings in which both amino groups are attached to aliphatic carbons, such as p-xylylene diamine, are also meant to be included. Representative aliphatic (and cycloaliphatic) primary diamines are ethylene diamine, 1,2-propylene diamine, methylene diamine, 1,3- and 1,4-diaminocyclohexane, 2,4- and 2,6-diaminomethylcyclohexane, m- and p-xylylene diamine and bis(4-aminocyclohexyl)methane. Of these diamines, ethylene diamine and bis(4-aminocyclohexyl)methane are preferred because they are readily available and yield polymers having excellent physical properties.

Amino acids which can be used to provide the -Q'-radicals in the polymers of this invention are aliphatic (including cycloaliphatic) primary amino acids having a molecular weight of less than about 250. Amino acids containing aromatic rings in which the amino group is attached to aliphatic carbon, such as phenylalanine or 4-(B-aminoethyl)benzoic acid, are also meant to be included. Representative aliphatic and cycloaliphatic primary amino acids are glycine, alanine, B-alanine, phenylalanine, 6-aminohexanoic acid, 11-aminoundecanoic acid and 4-aminocyclohexanoic acid. Of these amino acids, glycine and B-alanine are preferred because they are readily available and yield polymers having excellent physical properties.

A second and preferred class of thermoplastic elastomers (a) suitable for use in the practice of the present invention are the poly(etherimide esters) as described in McCready, copending U.S. Pat. No. 4,556,705 filed Oct. 26, 1984, and copending U.S. Pat. No. 4,556,688, filed Jan. 11, 1985, entitled "Thermoplastic Polyetherimide Ester Elastomers", both incorporated herein by reference. In general, the poly(etherimide esters) of McCready are random and block copolymers prepared by conventional processes from (i) one or more diols, (ii) one or more dicarboxylic acids and (iii) one or more polyoxyalkylene diimide diacids or the reactants therefore. The preferred poly(etherimide esters) are prepared from (i) a $C_2$ to $C_{19}$ aliphatic and/or cycloaliphatic diol, (ii) a $C_4$ to $C_{19}$ aliphatic, cycloaliphatic and/or aromatic dicarboxylic acid or ester derivative thereof and (iii) a polyoxyalkylene diimide diacid wherein the weight ratio of the diimide diacid (iii) to dicarboxylic acid (ii) is from about 0.25 to 2.0, preferably from about 0.4 to 1.4.

The diols (i) suitable for use herein are essentially the same as those used to provide the -D- radical in formulas II and IV as described above.

Dicarboxylic acids (ii) which are suitable for use in the preparation of the poly(etherimide esters) are aliphatic, cycloaliphatic, and/or aromatic dicarboxylic acids. These acids are preferably of a low molecular weight, i.e., having a molecular weight of less than about 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. The molecular weight preference, mentioned above, pertains to the acid and not to its equivalent ester or ester-forming derivative. Thus, an ester of a dicarboxylic acid having a molecular weight greater than 350 or an acid equivalent of a dicarboxylic acid having a molecular weight greater than 350 are included provided the acid has a molecular weight below about 350. Additionally, the dicarboxylic acids may contain any substituent group(s) or combinations which do not substantially interfere with the polymer formation and use of the polymer of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2- dicarboxylic acid, 2-ethylsuberic acid, tetramethylsuccinic acid, cyclopentane dicarboxylic acid, decahydro-1,5-naphthalene dicarboxylic acid, 4,4'-bicyclohexyl dicarboxylic acid, decahydro2,6-naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxybis(benzoic acid), ethylene-1,2- bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p($\beta$-hydroxyethoxy)benzoic acid can also be used provided an aromatic dicarboxylic acid is also present.

Preferred dicarboxylic acids for the preparation of the polyetherimide esters are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the preparation of the poly(etherimide ester), it is preferred that at least about 60 mole %, preferably at least about 80 mole %, based on 100 mole of dicarboxylic acid (ii) be of the same dicarboxylic acid or ester derivative thereof. As mentioned above, the preferred poly(etherimide esters) are those in which dimethylterephthalate is the predominant dicarboxylic acid, most preferably when dimethylterephthalate is the only dicarboxylic acid.

Polyoxyalkylene diimide diacids (iii) are high molecular weight diimide diacids wherein the number average molecular weight is greater than about 700, most preferably greater than about 900. They may be prepared by the imidization reaction of one or more tricarboxylic acid compounds containing two vicinal carboxyl groups or an anhydride group and an additional carboxyl group, which must be esterifiable and preferably is nonimidizable, with a high molecular weight polyoxylalkylene diamine. These polyoxyalkylene diimide diacids and processes for their preparation are more fully disclosed in McCready, pending U.S. patent application Ser. No. 665,192 filed Oct. 26, 1984, now abandoned, incorporated herein by reference.

In general, the polyoxyalkylene diimide diacids are characterized by the following formula:

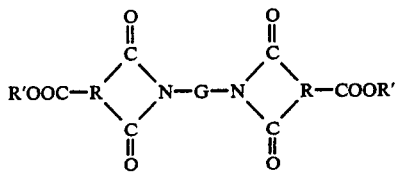

V wherein each R is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is as described above in formulas I and III above except that it is derived from an equivalent long chain poly(oxy alkylene) diamine, i.e. amine functionality rather than hydroxy functionality.

The tricarboxylic component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially non-imidizable. Further, while trimellitic anhydride is preferred as the tricarboxylic component, any of a number of suitable tricarboxylic acid constituents will occur to those skilled in the art including 2,6,7 naphthalene tricarboxylic anhydride; 3,3',4 diphenyl tricarboxylic anhydride; 3,3',4 benzophenone tricarboxylic anhydride; 1,3,4 cyclopentane tricarboxylic anhydride; 2,2',3 diphenyl tricarboxylic anhydride; diphenyl sulfone - 3,3',4 tricarboxylic anhydride, ethylene tricarboxylic anhydride; 1,2,5 naphthalene tricarboxylic anhydride; 1,2,4 butane tricarboxylic anhydride; diphenyl isopropylidene 3,3',4 tricarboxylic anhydride; 3,4 dicarboxyphenyl 3'-carboxylphenyl ether anhydride; 1,3,4 cyclohexane tricarboxylic anhydride; etc. These tricarboxylic acid materials can be characterized by the following formula:

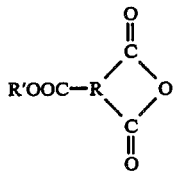

IV where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{12}$ aromatic radicals, e.g. benzy; most preferably hydrogen.

In the preparation of the poly(etherimide ester)s, the diimide diacid may be preformed in a separate step prior to polymerization or they may be formed during polymerization itself. In the latter instance, the polyoxyalkylene diamine and tricarboxylic acid component may be directly added to the reactor together with the diol and dicarboxylic acid, whereupon imidization occurs concurrently with esterification. Alternatively, the polyoxyalkylene diimide diacids may be preformed prior to polymerization by known imidization reactions including melt synthesis or by synthesizing in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture. Preferred polyetherimide esters are those in which the weight ratio of the polyoxyalkylene diimide diacid (iii) to dicarboxylic acid (ii) is from about 0.25 to about 2, preferably from about 0.4 to about 1.4.

Especially preferred polyetherimide esters comprise the reaction product of dimethylterephthalate, optionally with up to 40 mole % of another dicarboxylic acid; 4-butanediol, optionally with up to 40 mole % of another saturated or unsaturated aliphatic and/or cycloaliphatic diol; and a polyoxyalkylene diimide diacid prepared from a polyoxyalkylene diamine of number average molecular weight of from about 400 to about 12000, preferably from about 900 to about 4000, and trimellitic anhydride. In its most preferred embodiments, the diol will be 100 mole % 1,4- butanediol and the dicarboxylic acid 100 mole % dimethylterephthalate.

As mentioned, the polyetherimide esters may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference.

The second component(B) of the compositions of the instant invention are high molecular weight thermoplastic polyesters derived from one or more diols and one or more dicarboxylic acids. Suitable diols and dicarboxylic acids useful in the preparation of the polyester component include those diols(i) and dicarboxylic acids(ii) mentioned above for use in the preparation of the polyetherimide esters of McCready. Preferred polyesters are the aromatic polyesters derived from one or more aliphatic and/or cycloaliphatic diols and an aromatic dicarboxylic acid. Aromatic dicarboxylic acids from which the aromatic polyesters may be derived include for example the phthalic, isophthalic and terephthalic acids; naphthalene 2,6-dicarboxylic acid and the ester derivatives there of as well as other aromatic dicarboxylic acids mentioned above. Additionally, these polyesters may also contain minor amounts of other units such as aliphatic dicarboxylic acids and aliphatic polyols and/or polyacids.

Preferred aromatic polyesters will generally have repeating units of the following formula:

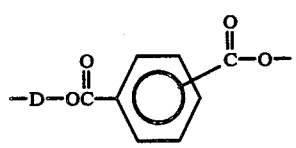

VII where D is as defined above in formulas II and IV for aliphatic and cycloaliphatic diols. Most preferably D is derived from a $C_2$ to $C_6$ aliphatic diol. Exemplary of the preferred aromatic polyesters there may be given poly(butylene terephthalate), poly(butylene terephthalate-co-isophthalate), poly(ethylene terephthalate) and blends thereof, most preferably poly(butylene terepthalate).

The polyesters described above are either commercially available or can be produced by methods well known in the art, such as those set forth in U.S. Pat. Nos. 2,465,319; 3,047,539 and 2,910,466, herein incorporated by reference. Illustratively, the high molecular weight thermoplastic polyesters (b) will have an intrinsic viscosity of at least about 0.4 decilliters/gram and, preferably, at least about 0.7 decilliters/gram as measured in a 60:40 phenol/tetrachloroethane mixture at 30° C.

The third required component (C) of the compositions of the instant invention is a modifier resin or resin combination wherein the modifier resin is derived from one or more monomers selected from the group consisting of vinyl aromatic monomer, esters of acrylic or alkylacrylic acid and conjugated dienes. Typically, the preferred modifier resins will comprise a predominate amount of monomer or monomers selected from the foregoing group. Additionally, preferred modifier resins will be of a rubbery nature. Further, as will be obvious from the more detailed description below, many of the preferred modifier resins are derived from two or more of the required monomeric units.

The first class of modifier resins are those derived from the vinyl aromatic monomers. These include both homopolymers and copolymers, including random, block, radial block, and core-shell copolymers. Specifically, suitable vinyl aromatic modifier resins include for example modified and unmodified polystyrenes, ABS type graft copolymers; AB and ABA type block and radial block copolymers and vinyl aromatic conjugated diene core-shell graft copolymers.

Modified and unmodified polystyrenes include homopolystyrene and rubber modified polystyrenes such as butadiene rubber modified polystyrene otherwise referred to as high impact polystyrene or HIPS. Additional useful polystyrenes include copolymers of styrene and various monomers, including for example poly(styrene-acrylonitrile (SAN) as well as the modified alpha and para substituted styrenes and any of the styrene resins disclosed in U.S. Pat. No. 3,383,435, herein incorporated by reference.

ABS type graft copolymers and processes for their production are well known and widely available commercially. Typically, these copolymers are prepared by polymerizing a conjugated diene alone or in combination with a monomer copolymerizable therewith to form a rubbery polymeric backbone. After formation of the backbone, at least one grafting monomer and preferably two, are polymerized in the presence of the prepolymerized backbone to obtain the graft copolymer. Suitable conjugated dienes may be substituted or non-substituted and include, but are not limited to, butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, dichlorobutadiene, bromobutadiene, dibromobutadiene, and mixtures thereof. Monomers copolymerizable therewith to form the rubber backbone include the monoalkenyl arene monomers, the acrylonitriles and the acrylic acid esters, as hereinafter defined. Preferred rubbery backbone polymers are derived from butadiene, alone or in combination with styrene or acrylonitrile, most preferably polybutadiene.

One class of graft monomer or comonomers that may be polymerized in the presence of the prepolymerized backbone are the monoalkenyl arene monomers and substituted derivatives thereof. Exemplary of such suitable substituted and non-substituted monoalkenyl arene monomers include styrene, 3-methylstyrene; 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, mixtures thereof, and the like. The preferred monovinylaromatic hydrocarbons used are styrene and/or alpha-methylstyrene.

A second class of suitable graft comonomers are the acrylic monomers such as the acrylonitriles and the acrylic and alkyl acrylic acid esters. Exemplary of such suitable graft monomers include, but are not limited to acrylonitrile, ethacrylonitrile, methacrylolimited nitrile, alpha-chloroacrylonitrile, beta-chloroacrylonitrile, alpha-bromoacrylonitrile, and beta-bromo-acrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

Typically, the conjugated diene polymer or copolymer backbone comprises from about 5 to about 50, preferably, from about 20 to about 50, percent by weight of the total graft copolymer; the reminder comprising the graft component. Additionally, the mono alkenyl arene monomer will comprise from about 30 to about 70 by weight of the total graft copolymer and is preferably styrene. Finally, where the second group of graft monomers is present, exemplified by acrylonitrile, ethyl acrylate or methyl methacrylate, they will comprise from about 10 to about 40 percent by weight of the total graft compolymer.

An additional class of vinyl aromatic reson modifiers within the scope of the present invention are the block copolymers comprising mono alkenyl arene blocks and hydrogenated, partially hydrogenated and non-hydrogenated conjugated diene blocks and represented as AB and ABA block copolymers. Suitable mono alkenyl arene and conjugated diene monomers for use in the preparation of the block copolymers include those mentioned above for the preparation of the ABS type graft copolymers. Of course it will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkeny arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, most preferably styrene. The B blocks may comprise homopolymers of butadiene or isoprene and copolymers of one of these two dienes with a monoalkenyl arene as long as the B blocks predominate in conjugated diene units. When the monomer employed is butadiene, it is preferred that between about 35 and about 55 mole percent of the condensed butadiene units in the butadiene polymer block have 1,2 configuration. Thus, when a hydrogenated or partially hydrogenated block copolymer is desired, it is or has segments which are or resemble a regular copolymer block of ethylene and butene-1 (EB). If the conjugated diene employed is isoprene, the resulting hydrogenated product is or resembles a regular copolymer block of ethylene and propylene (EP).

When hydrogenation of the block copolymer is desired, it may be and is preferably effected by use of a catalyst comprising the reaction products of an aluminum alkyl compound with nickel or cobalt carboxylates or alkoxides under such conditions as to preferably substantially completely hydrogenate at least 80% of the aliphatic double bonds while hydrogenating no more than about 25% of the alkenyl arene aromatic double bonds. Preferred hydrogenated block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000 preferably 7,000–60,000 while the conjugated diene blocks either before or after hydrogenation will have number average molecular weights in the order of 10,000–300,000 preferably 30,000–150,000. The total number average molecular weight of block copolymer is typically in the order of 25,000 to about 350,000, preferably from about 35,000 to about 300,000. These molecular weights are most accurately determined by tritium counting methods or osmotic pressure measurements.

The proportion of the monoalkenyl arene blocks should be between about 8 and 55% by weight of the block copolymer, preferably between about 10 and 30 percent by weight.

These block copolymers may have a variety of geometrical structures, since the invention does not depend on any specific geometrical structure, but rather upon the chemical constitution of each of the polymer blocks. Thus, the structures may be linear, radial or branched. The specific structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the polymers or precursor polymers, where hydrogenation of the final block polymer is desired, of three or more. Coupling may be effected with multifunctional coupling agents such as dihaloalkanes or dihaloalkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored.

Various methods, including those as mentioned above, for the preparation of the block copolymers are known in the art. For example, AB type block copolymers and processes for the production thereof are disclosed in for example U.S. Pat. Nos. 3,078,254; 3,402,159; 3,297,793; 3,265,765; and 3,594,452 and UK Pat. No. 1,264,741, all herein incorporated by reference. Exemplary of typical species of AB block copolymers there may be given:
polystyrene-polybutadiene (SBR)
polystyrene-polyisoprene and
poly(alpha-methylstyrene)-polybutadiene.

Such AB block copolymers are available commercially from a number of sources including Phillips under the trademark Solprene.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference. In such processes, particular preference is made to the use of lithium based catalysts and especially lithium alkyls for the preparation of the block polymers.

Exemplary of typical species of triblock copolymers there may be given:
polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methylstyrene). A particularly preferred class of such copolymers are available commercially as KRATON ® and KRATON G ® from Shell. The Kraton block copolymers comprising least two monoalkenyl arene polymer end blocks A and at least one hydrogenated, partially hydrogenated or non-hydrogenated conjugated diene polymer mid block B, said block copolymer having an 8 to 55 percent by weight monoalkenyl arene block content, each polymer block A having a number average molecular weight of between about 5,000 and about 125,000, and each polymer block B having a number average molecular weight of between about 10,000 and about 300,000.

The second class of modifier resins are those derived from the esters of acrylic or alkyl acrylic acid. Exemplary of such modifier resins there may be given the homopolymers and copolymers of alkyl acrylates and alkyl methacrylates in which the alkyl group contains from 1 to 8 carbon atoms: including for example methyl acrylate, ethyl acrylate, butyl acrylate, methyl methacrylate, ethyl methacrylate and butyl methacrylate. Suitable copolymers include the copolymers of the foregoing with vinyl or allyl monomers (e.g. acrylonitrile, N-allymaleimide or N-vinyl maleimide) or with alpha-olefins (e.g. ethylene). Especially preferred alkyl acrylate resins are the homopolymers and copolymers of methyl methacrylate (e.g. polymethyl methacrylate).

The third class of modifier resins are those described from conjugated dienes. While many copolymers containing conjugated dienes have been discussed above, additional conjugated diene modifier resins include for example homopolymers and copolymers of one or more conjugated diene including for example polybutadiene rubber or polyisoprene rubber. Finally, ethylene-propylene-diene monomer rubbers are also intended to be within the scope of the present invention. These EPDMs are typified as comprising predominately ethylene units, a moderate amount of propylene units and only a minor amount, up to about 20 mole percent of diene monomer units. Many such EPDM's and processes for the production thereof are disclosed in U.S. Pat. Nos. 2,933,480; 3,000,866; 3,407,158; 3,093,621 and 3,379,701, herein incorporated by reference.

Finally, one group of modifier resins which transcends all of the above classes are the core-shell type graft copolymers. In general these are characterized as having a predominately conjugated diene rubbery core or a predominately crosslinked acrylate rubbery core and one or more shells polymerized thereon and derived from monoalkenyl arene and/or acrylic monomers alone or, preferably, in combination with other vinyl monomers.

More particularly, the first or core phase of the core-shell copolymer preferably comprises polymerized conjugated diene units of one or more conjugated dienes alone or copolymerized with units of a vinyl monomer or mixture of vinyl monomers. Suitable conjugated dienes for use in said core phase include butadiene, isoprene, 1,3-pentadiene and the like. Illustrative of the vinyl monomers copolymerizeable therewith include the vinyl aromatic compounds such as styrene, alpha-methylstyrene, vinyl toluene, para-methylstyrene and the like; esters of acrylic and methacrylic acid, including for example methyl acrylate, ethyl acrylate, butyl acrylate, methyl methacrylate and ethyl methacrylate; and unsaturated aliphatic nitriles such as acrylonitrile, methacrylonitrile and the like. The core of said copolymer should comprise at least about 50 percent by weight of the conjugated diene. Preferred grafted core-shell copolymers for use herein comprise a core of polybutadiene homopolymer or a styrene-butadiene copolymer comprising about 10 to 50% by weight styrene and about 90 to 50% by weight of butadiene, having a molecular weight of from about 150,000 to about 500,000. The core phase may also include a cross-linking monomer, more particularly described below.

On the other hand, as the cross-linked elastomeric trunk polymer for use in preparing graft-copolymer of the present invention, a homopolymer of a $C_4$ to $C_{10}$-alkyl acrylate or a copolymer containing not less than 50% by weight of the alkyl acrylate is utilized, particularly, butyl acrylate, octyl acrylate and the like. The rubber-like properties of the thus prepared graft-copolymer is exhibited only in th case of using not less than 50% by weight of the alkyl acrylate, the graft copolymer containing less than 50% by weight of the alkyl acrylate being undesirable because of the poor pliablity of the composition of polyester-block copolymer prepared by using the graft-copolymer. As the monomer which is copolymerized with the alkyl acrylate in an amount of less than 50% by weight, aromatic vinyl monomers such as styrene, alpha-methylstyrene and the like, alkyl methacrylates such as methyl methacrylate, ethyl methacrylate and the like, unsaturated aliphatic nitriles such as acrylonitrile, methacrylonitrile, and the like, and diene compounds such as butadiene, chloroprene and the like are mentioned.

The final or shell phase of the copolymer comprises polymerized units of a monoalkenyl arene and/or esters of acrylic or methacrylic acid, alone or copolymerized with one or more other vinyl monomers wherein at least 10 mole percent preferably at least 40 mole percent, of the graft component is derived from the monoalkenyl arene monomer and/or esters of acrylic or methacrylic acid. Preferred monoalkenyl arene monomers are styrene, alpha-methylstyrene, para-methylstyrene and the like, most preferably styrene. Preferred esters of acrylic and methacrylic acid include ethyl acrylate, methyl acrylate, butyl acrylate, methyl methacrylate, ethyl methacrylate, butyl methacrylate and the like most preferably methyl methacrylate. Additional monomers that may be copolymerized therewith include unsaturated aliphatic nitrile such as acrylonitrile and methacrylonitrile and vinyl halides such as vinyl chloride and vinyl bromide. Especially preferred shells particularly for the conjugated diene rubbery core polymers are those derived from polymerized units of styrene and/or methyl methacrylate wherein each is present in an amount of from 10 to 90 mole %. Additionally, these shells may also have copolymerized therewith a minor amount, preferably less than 10 mole % of one or more of the other aforementioned monomer units. These shells may also be used with the acrylate rubbery core however, where such a core is employed it is preferred to have a polymethyl methacrylate shell or a polymethyl methacrylate shell copolymerized with a minor amount, preferably less than 10 mole percent, of an additional monomer. As with the core, the shell phase may also include a cross-linking monomer as discussed more fully below.

Optionally, the core-shell copolymers may further comprise one or more cross-linked or non-cross-linked intermediate layers which is grafted to the core and upon which the final shell layer is grafted, derived from one or more polymerized vinyl monomer. Suitable vinyl monomers for use in these intermediate layers include but are not limited to those mentioned above, especially polystyrene. Where such intermediate layers are present in the core-shell copolymer and are derived from at least 10 mole % of a monoalkenyl arene monomer, the final or shell phase may comprise up to and including 100 mole % monomer units which are not monoalkenyl arene units. Especially preferred in such instances are multi-phase copolymers wherein the intermediate phase comprises polystyrene and the final stage comprises polymethylmethacrylate.

As mentioned each of the individual stages of the core-shell copolymers may contain a cross-linking monomer which may serve not only to cross-link the units of the individual layers but also graft-link the shell to the core. As the cross-linking agent for use in preparation of the core-shell copolymers, those which copolymerize smoothly with the monomer in the respective stages of the reaction should be selected. Representative cross-linking agents include, but are not limited to aromatic polyfunctional vinyl compounds such as divinyl benzene, trivinyl benzene, divinyl toluene and the like; di and tri- methacrylates and di and triacrylates of polyols represented by monoethylene-, diethylene- and triethylene glycols, 1,3-butanediol and glycerin allyl esters of unsaturated aliphatic carboxylic acid such as allyl acrylate, allyl methacrylate and the like and di- and triallyl compounds such as diallyl phthalate, diallyl sebacate, triallytriazine and the like are mentioned.

While the amount of cross-linking agent employed is from about 0.01 to 3.0% by weight based on the monomer charge for each stage of the reaction, generally, the total amount of cross-linking agent in the final graft copolymer will preferably be less than 3.0 weight percent.

The core-shell copolymers suitable for use herein generally comprise from about 50 to about 90 weight percent of the core and from about 10 up to 50 weight percent of the graft or shell phase. Where an intermediate phase or layer is present in the graft copolymer the shell and intermediate phase will each comprise from about 5 to about 25 weight percent of the copolymer.

In a most preferred embodiment, where a core-shell copolymer is employed as the modifier resin it is desirable to precompound the core-shell copolymer with the poly(butylene terephthalate) or a portion thereof. As identified by Yusa et al. (U.S. Pat. No. 4,442,262), the use of core-shell copolymers in general with copolyetheresters results in the occurrence of surface roughness and fisheyes. Applicant has now surprisingly found that otherwise unsuitable core-shell copolymers may be employed without the occurrence of fisheye if the core-shell copolymer is pre-compounded with the poly(butylene terephthalate). Equally surprising is the finding that the use of the pre-compounded core-shell copolymer results in composition having unexpectedly improved physical properties as compared to those compositions wherein the poly(butylene terephthalate) and core-shell copolymers were not precompounded. In practice most any ratio of core-shell copolymer to poly(butylene terephthalate) may be used; however, it is preferred that the ratio of 4:1 to 1:4, most preferably 3:2 to 2:3, be employed to provide greater dispersibility of the core-shell copolymer in the final composition.

Finally, while the foregoing is concerned with precompounding of the core-shell copolymer, the concept of precompounding is equally applicable to any of modifier resins (C).

The core-shell graft copolymers for use in the present invention are prepared by the conventional method of emulsion polymerization, however, in an alternative method, graft copolymerization may be carried out after suitably coagulating the latex of cross-linked trunk polymer for adjusting the size of the latex particles of the trunk polymer.

Also, during polymerization the monomeric components used in the graft copolymerization may be brought into reaction in one step, or in multiple steps while supplying them in portions of suitable ratio of the present invention between the components.

Specific examples of suitable core-shell graft copolymers and the production thereof are disclosed in for example U.S. Pat. Nos. 4,180,494, 4,034,013; 4,096,202; 3,808,180 and 4,292,233; herein incorporated by reference. Commercially available grafted core-shell copolymers for use herein include the KM653 and KM611 butadiene based core-shell copolymers and the KM330 acrylate based core-shell copolymers from Rohm and Haas Chemical Company.

Optionally, the composition of the present invention may further comprise clay filler. Clays are well known and widely available commercially. Preferred clays are the crystalline and paracrystalline clays. Especially preferred are the crystalline clays, most preferably the Kaolin clays. The clays, particularly the Kaolin clays, may be in the hydrous form or in the calcined, anhydrous form. Exemplary of commercially available, suitable clays there may be given the clays available under the tradenames Whitex and Translink from Freeport Kaolin.

Additionally, it is preferred, although not required, to utilize clay fillers which have been treated with a titanate or silane coupling agent. Exemplary of such coupling agents there may be given vinyl tris 2-methoxy ethoxy silane and gamma-aminopropyl triethyoxy silane (A-1100, Union Carbide).

The formulation of the composition of the present invention may vary widely depending upon the desired physical properties of and the anticipated end use application for the final composition. Generally any combination of components A through C may be employed: where component D, clay filler, is employed it should comprise no more than 50% by weight of the total composition.

Typically, the compositions of the present invention will comprise, in parts by weight, from about 90 to about 5 parts A, from about 5 to about 90 parts B, from about 5 to about 35 parts C and from 0 up to about 30 parts D. While compositions of greater than about 50 parts by weight of component B are especially suited for applications requiring very stiff or rigid materials, an especially preferred class of composition within the scope of the present invention are those which have the excellent stress-strength characteristics of the more rigid compositions yet retain excellent flexibility. Such compositions will generally comprise, in parts by weight, from about 90 to about 40 preferably from about 70 to about 45 parts component A; from about 5 to about 55, preferably from about 20 to about 45 parts, component B; from about 5 to about 30, preferably from about 10 to about 20 parts component C; and, optionally up to about 25, preferably up to about 15, parts component D.

While the compositions of this invention possess many desirable properties, it is sometimes advisable and preferred to further stabilize certain of the compositions against thermal or oxidative degradation as well as degradation due to ultraviolet light. This can be done by incorporating stabilizers into the blend compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxyethyl-s-triazine-2,4,6-(1H, 3H, 5H) trione; 4,4'-bis(2,6-ditertiary-butylphenyl); 1,3,5-trimethyl-2,4,6-tris(3,5-ditertiary-butyl-4-hydroxylbenzyl)benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typically amine stabilizers include N,N'-bis(beta-naphthyl)-p-phenylenediamine; N,N'-bis(1-methylheptyl)-p-phenylenediamine and either phenyl-beta-napththyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

The compositions of the present invention may be prepared by any of the well known techniques for preparing polymer blends or admixtures, with extrusion blending being preferred. Suitable devices for the blending include single screw extruders, twin screw extruders, internal mixers such as the Bambury Mixer, heated rubber mills (electric or oil heat) or Farrell continuous mixers. Injection molding equipment can also be used to accomplish blending just prior to molding, but care must be taken to provide sufficient time and aggitation to insure uniform blending prior to molding.

Alternatively, the compositions of the present invention may be prepared by dry blending the components prior to extrusion or injection molding. Finally, as mentioned, any two or more of the components, preferably at least B and C where C is a core-shell copolymer, may be pre-compounded prior to compounding with the copolyetherimide ester.

The polymer compositions prepared in accordance with the present invention are suitable for a broad range of applications. These compositions manifest excellent physical attributes making them especially suited for applications requiring excellent stress-strength characteristics and low temperature impact strength yet maintaining good flexibility.

The following examples are given as exemplary of the present invention and are not to be construed as limiting thereto.

DETAILED DESCRIPTION OF THE PREFERRED EMBODIMENTS

The following ASTM methods were used in determining the physical characteristics of the compositions:
Flexural Modulus: ASTM D790
Tensile Elongation: ASTM D638
Notched Izod: ASTM D256
Unnotched Izod: ASTM D256

Other physical properties were determined in accordance with procedures known and accepted in the art. Dynatup is a measure of stress-strength properties of the composition and is expressed as Emax/Etotal wherein Emax is the maximum energy the standard part can withstand under deflection before permanent deformation (i.e. non-recoverable deflection) and Etotal is the total energy the part can withstand before mixture.

All compositions were prepared by melt blending the thermoplastic elastomer with the thermoplastic polyester in a Prodex single screw extruder. Further, all compositions contained 0.5-0.7 parts by weight stabilizer.

PEIE A-C

PEIE A-C are polyetherimide esters prepared from butanediol, dimethylterephthalate, poly(propylene ether) diamine (number average MW 2000) and trimellitic anhydride, wherein the weight ratio of dimethylterephthalate to diimide diacid was such as to produce polymers of flexural modulus as follows:
PEIE A: 10,000 psi
PEIE B: 15,000 psi
PEIE C: 25,000 psi

EXAMPLES 1 AND 2, COMPARATIVE EXAMPLES A-C

Two series of compositions employing two different modulus copolyetherimide ester were prepared. Each series demonstrates polyester modified copolyetherimide esters and such compositions further containing a copolymer as taught by the present invention. The specific formulations and the physical properties thereof are presented in Table 1.

As is apparent from the results shown in Table 1, the compositions of the present invention have markedly superior low temperature impact strength as compared to polyester modified copolyetherimide esters. Additionally, by practicing the present invention, compositions are attainable which have excellent flexibility, as evident by the lower flexural modulus, combined with the excellent impact properties.

EXAMPLES 3-19

A second series of compositions within the scope of the present invention were prepared demonstrating the broad scope of the teachings hereof. The specific formulations and the physical properties thereof were as presented in Table 2. As is apparent compositions of excellent physical properties are attainable within a wide variation of formulations.

TABLE 1

|  | A | B | 1 | C | 2 |
|---|---|---|---|---|---|
| PEIE B | 80 | 65 | 65 | — | — |
| PEIE C | — | — | — | 65 | 65 |
| PBT[a] | 20 | 35 | 5 | 35 | 5 |
| KM CONC.[b] | — | — | 30 | — | 30 |
| Notched Izod ft lb/in | NB | 5.6 | NB | NB | NB |
| Notched Izod, −30° C., ft lb/in | 3.1 | 2.8 | 5.1 | 1.3 | 2.9 |
| Unnotched Izod, −30° C., ft lb/in | NB | NB | NB | NB | NB |
| Flexural Modulus, psi × $10^3$ | 33.6 | 76.9 | 34.4 | 99.3 | 50.5 |
| Tensile Elongation, % | 228 | 300 | 270 | 260 | 330 |

[a] poly(1,4-butylene terephthalate) available from General Electric Company as VALOX ® 315 resin.
[b] A copolymer concentrate comprising 45 parts by weight of a butadiene based core shell copolymer (Rohm & Haas KM 653) in 55 parts by weight VALOX 315 resin.

TABLE 2

|  | 3 | 4 | 5 | 6 | 7 | 8 | 9 | 10 | 11 |
|---|---|---|---|---|---|---|---|---|---|
| PEIE A | 58 | 50 | 45 | 40 | 40 | 40 | 15 | — | — |
| PEIE B | — | — | — | — | — | — | — | 90 | 70 |
| PEIE C | — | — | — | — | — | — | — | — | — |
| PBT I[a] | — | — | — | — | — | 30 | — | — | — |
| PBT II[b] | 25 | 40 | 35 | 30 | 46 | — | 70 | 5 | 25 |
| KM Conc. | 15 | 10 | 20 | 30 | 15 | 30 | 15 | 5 | 5 |
| Pigment | 2 | — | — | — | — | — | — | — | — |
| Notched Izod ft lb/in | NB | 5.2 | 5.1 | NB | NB | 4.8 | 3.7 | NB | NB |
| Unnotched Izod, −30° C. ft lb/in | NB | NB | NB | NB | NB | NB | NB | NB | NB |
| Flexural Modulus, psi × $10^3$ | 49 | 95 | 96 | 123 | 120 | 112 | 202 | 17 | 39 |
| Tensile strength, psi | 2800 | 3860 | 3900 | 3960 | 4200 | 3840 | 8090 | 2000 | 2650 |
| Tensile Elongation, % | 150 | 310 | 350 | 330 | 390 | 290 | 340 | 220 | 230 |
| Heat Sag. 290° F., 30 min/mm | — | 17 | 17 | 21 | — | 23 | — | — | — |
| Dynatup, −30° C., $E_{max}/E_{total}$ | 16/27 | 18/31 | 18/30 | 24/47 | 22/37 | 21/41 | 20/37 | 19/31 | 21/35 |

|  | 12 | 13 | 14 | 15 | 16 | 17 | 18 | 19 |
|---|---|---|---|---|---|---|---|---|
| PEIE A | — | — | — | — | — | — | — | — |
| PEIE B | 65 | 70 | 50 | 70 | 65 | 60 | 55 | 60 |
| PEIE C | — | — | — | — | — | — | — | — |
| PBT I[a] | — | — | — | — | — | — | — | — |
| PBT II[b] | 20 | 15 | 25 | 5 | 20 | 30 | 20 | 30 |
| KM Conc. | 15 | 15 | 25 | 25 | 15 | 10 | 20 | 20 |

TABLE 2-continued

| | | | | | | | | |
|---|---|---|---|---|---|---|---|---|
| Pigment | — | — | — | — | — | — | — | — |
| Notched Izod ft lb/in | NB | NB | NB | NB | NB | 5.9 | 15.2 | NB |
| Unnotched Izod, −30° C. ft lb/in | NB | NB | NB | NB | NB | NB | NB | NB |
| Flexural Modulus, psi × $10^3$ | 34 | 32 | 46 | 20 | 51 | 89 | 90 | 103 |
| Tensile strength, psi | 2840 | 2480 | 2880 | 2000 | 4160 | 4450 | 4090 | 4200 |
| Tensile Elongation, % | 270 | 220 | 260 | 195 | 330 | 280 | 240 | 230 |
| Heat Sag. 290° F., 30 min/mm | — | — | — | — | — | 13 | 14 | 25 |
| Dynatup, −30° C., $E_{max}/E_{total}$ | 21/34 | 19/32 | 19/32 | 15/23 | 25/37 | 15/25 | 19/32 | 20/29 |

$a$ and $b$ Poly(1,4 butylene terephthalate) polyesters from General Electric as VALOX$^3$ 295 and VALOX$^3$ 315 resins, respectively.
$c$ footnote b Table 1

EXAMPLES 20-23

An additional series of compositions were prepared further demonstrating the breadth of the present invention. These compositions exemplify compositions within the scope of the present invention in which various copolymer modifier resins were employed. The specific formulations and the properties of these compositions were as shown in Table 3.

EXAMPLES 24-37

A final series of examples were prepared demonstrating clay filled compositions having reduced heat sag. These compositions and the physical properties thereof were as presented in Table 4.

Obviously, other modifications will suggest themselves to those skilled in the art in light of the above, detailed description. All such modifications are within the full intended scope of the present invention as defined by the appended claims.

TABLE 3

| | 20 | 21 | 22 | 23 |
|---|---|---|---|---|
| PEIE B | 65 | 65 | 65 | 65 |
| PBT$^a$ | 20 | 20 | 20 | 20 |
| KM-99A$^b$ | 15 | — | — | — |
| KRATON$^c$ | — | 15 | — | — |
| ABS$^d$ | — | — | 15 | — |
| ASA$^e$ | — | — | — | 15 |
| Notched Izod, Ft lb/in | NB | NB | 2.9 | 3.8 |
| Unnotched Izod Ft lb/in, −30° C. | NB | NB | NB | 8.1 |
| Flexural modulus, psi × $10^3$ | 27 | 28.6 | 40 | 42 |
| Tensile strength psi | 2350 | 2520 | 2480 | 2600 |
| Tensile Elongation % | 230 | 240 | 120 | 140 |

$a$ See Table 1
$b$ Concentrate of 3 parts crosslinked acrylic based core-shell copolymer (Rohm and Haas KM 330) in 1 part by weight ethylene ethylacrylate copolymer.
$c$ Polystyrene-polybutadiene - polystyrene triblock copolymer from Shell.
$d$ Acrylonitrile butadiene-styrene graft copolymer from Monsanto.
$e$ Acrylic based, core-shell copolymer available from General Electric Company under the Trademark GELOY.

TABLE 4

| | 24 | 25 | 26 | 27 |
|---|---|---|---|---|
| PEIE A | 40 | — | — | 37 |
| PEIE C | — | 40 | 47 | — |
| PBT$^a$ | 25 | 25 | 18 | 28 |
| KM CONC$^b$ | 20 | 20 | 30 | 30 |
| Clay$^c$ | 15 | 15 | 5 | 5 |
| Notched Izod, ft lb/in | 4.0 | 2.4 | 5.4 | 5.1 |
| Notched Izod −30° C., ft lb/in | | | | |
| Unnotched Izod, −30° C., ft lb/in | NB | NB | NB | NB |
| Flexural Modulus, psi × $10^3$ | 103.5 | 107.4 | 88 | 95 |
| Tensile Elongation, % | 100 | 90 | 270 | 260 |
| Heat Sag. 290° F. 30 min/mm | 23 | 11 | 13 | 16 |

$a$ & $b$ See table 1
$c$ Silane treated Kaolin Clay available from Freeport Kaolin under the tradename TRANSLINK

We claim:

1. A thermoplastic molding composition comprising an admixture of
   (A) one or more thermoplastic elastomeric polymers characterized as having ether, ester and imide linkages and wherein the ether linkages are present as high molecular weight polyoxyalkylene or copolyoxyalkylene units derived from long chain ether diamines,
   (B) one or more high molecular weight thermoplastic polyesters, and
   (C) one or more homopolymer or copolymer modifier resins having as a major constituent units derived from one or more monomers selected from the group consisting of vinyl aromatics, esters of acrylic and alkyl acrylic acids and conjugated dienes.

2. The composition of claim 1 wherein the thermoplastic elastomeric polymer is a polyetherimide ester derived from (i) one or more diols (ii) one or more dicarboxylic acids or the ester derivative thereof and (iii) one or more poly(oxyalkylene) diimide diacids or the reactants therefore.

3. The composition of claim 2 wherein the diols are selected from the group consisting of $C_2$ to $C_8$ aliphatic and cycloaliphatic diols and at least 80 mole percent of the diols are the same.

4. The composition of claim 2 wherein the diol is 1,4 butanediol.

5. The composition of claim 2 wherein at least 80 mole percent of the dicarboxylic acids are the same and are selected from the group consisting of $C_4$ to $C_{16}$ aliphatic, cycloaliphatic or aromatic dicarboxylic acids and the ester derivatives thereof.

6. The composition of claim 5 wherein the predominant dicarboxylic acid is a $C_8$ to $C_{16}$ aromatic dicarboxylic acid or the ester derivative thereof.

7. The composition of claim 2 wherein the dicarboxylic acid is dimethyl terephthalate.

8. The composition of claim 2 wherein the polyetherimide ester is prepared from a preformed poly(oxyalkylene) diimide diacid characterized as having the following formula:

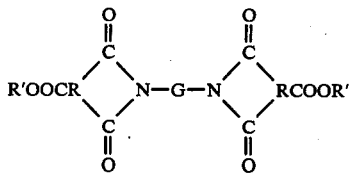

or the reactants therefor comprising monomers of the following formulas:

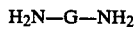

and

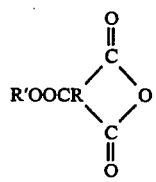

wherein each R is independently a $C_2$ to $C_{20}$ aliphatic, cycloaliphatic or aromatic trivalent organic radical; each R' is independently hydrogen or a $C_1$ to $C_6$ monovalent organic radical, and G is the radical remaining after removal of the terminal hydroxy groups of a long chain ether glycol having a number average molecular weight of from about 400 to about 12,000.

9. The composition of claim 8 wherein R is a $C_6$ to $C_{20}$ aromatic trivalent organic radical, R' is hydrogen or methyl and G is derived from a long chain ether glycol having a number average molecular weight of from about 900 to about 4000.

10. The composition of claim 8 wherein the long chain ether diamine is selected from the group consisting of poly(ethylene ether) diamine, poly(propylene ether) diamine, poly(tetramethylene ether) diamine and a copoly(ethylene ether-propylene ether) diamine.

11. The composition of claim 8 therein the long chain ether diamine is poly(propylene ether) diamine.

12. The composition of claim 8 wherein R is a $C_6$ aromatic trivalent radical derived from trimellitic anhydride.

13. The composition of claim 8 wherein the polyetherimide ester is derived from a preformed poly(oxyalkylene) diimide diacid which is the reaction product of trimellitic anhydride and poly(propylene ether) diamine having a number average molecular weight of from about 900 to about 4000.

14. The composition of claim 1 wherein the high molecular weight thermoplastic polyester (b) is selected from the group consisting of homopolyesters, copolyesters and blends of homopolymers, copolyesters or mixtures thereof, derived from (i) one or more $C_2$ to $C_{19}$ aliphatic, cycloaliphatic or aromatic diols and (ii) one or more $C_4$ to $C_{19}$ aliphatic, cycloaliphatic or aromatic dicarboxylic acids.

15. The composition of claim 1 wherein the high molecular weight thermoplastic polyester (b) is selected from the group consisting of aromatic homopolyesters, aromatic copolyesters and mixtures of said homopolyesters, copolyesters or both which are characterized as comprising repeating units of the following formula:

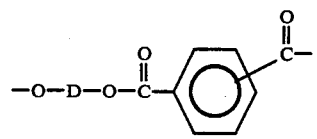

wherein D is the radical remaining after removal of the hydroxy groups of a $C_2$ to $C_8$ aliphatic or cycloaliphatic diol, with the proviso that at least about 80 mole percent of the units in the copolyesters are of the aromatic ester units.

16. The composition of claim 15 wherein the high molecular weight thermoplastic polyester (b) is poly(butylene terephthalate).

17. The composition of claim 1 wherein the modifier resin is selected from the group consisting of
(a) high impact polystyrene,
(b) ABS type graft copolymers,
(c) AB and ABA type block and radial block copolymers,
(d) random copolymers of styrene and monomers selected from the group consisting of acrylonitriles and conjugated dienes,
(e) ethylene-propylene-diene terpolymer rubber and
(f) core-shell copolymers characterized as having a predominately conjugated diene rubbery core or a predominately cross-linked acrylate rubbery core and one or more shells polymerized thereon and derived from monoalkenyl arene monomers, acrylic monomers, or a combination of monoalkenyl arene and acrylic monomers, alone or in combination with other vinyl monomers.

18. The composition of claim 17 wherein the modifier resin is an ABA type triblock copolymer comprising at least two monoalkenyl arene polymer end blocks A and at least one hydrogenated partially hydrogenated or non-hydrogenated conjugated diene polymer mid block B, said block copolymer having an 8 to 55 percent by weight monoalkenyl arene polymer block content, each polymer block A having a number average molecular weight of between 5,000 and 125,000, and each polymer block B having a number average molecular weight of between about 10,000 and about 300,000.

19. The composition of claim 18 wherein the block copolymer is polystyrene-polybutadiene-polystyrene block copolymer.

20. The composition of claim 17 wherein the monoalkenyl alkenyl arene-conjugated diene copolymer is a core-shell copolymer.

21. The composition of claim 20 wherein the core-shell copolymer is comprised of a polybutadiene core having polymerized thereon a shell derived from styrene and methylmethacrylate units.

22. The composition of claim 20 wherein the core-shell copolymer is comprised of a poly(butadiene-styrene) core having polymerized thereon a shell derived from styrene and methylmethacrylate.

23. The composition of claim 1 which further comprises up to 50% by weight, based on the total composition, of clay.

24. The composition of claim 23 wherein the clay is a Kaolin clay which has been treated with a sizing or coupling agent.

25. The composition of claim 1 comprising, in parts by weight, from about 90 to about 5 parts thermoplastic elastomer (A), from about 5 to about 90 parts thermoplastic polyester (B), from about 5 to about 35 parts modifier resin (C) and from 0 up to 30 parts clay (D).

26. The composition of claim 1 comprising, in parts by weight, from about 90 to about 40 parts thermoplastic elastomer (A), from about 5 to about 55 parts thermoplastic polyester (B), from about 5 to about 30 parts modifier resin (C) and from 0 up to 25 parts clay.

27. The composition of claim 1 wherein the modifier resin (C) is pre-compounded with at least a portion of the polyester resin (B).

28. The composition of claim 27 wherein the modifier resin is a core-shell copolymer.

29. The composition of claim 1 wherein the polyoxyalkylene or copolyoxyalkylene units have a number average molecular weight of from about 400 to about 12000.

* * * * *